(12) United States Patent
Pan et al.

(10) Patent No.: US 7,800,810 B2
(45) Date of Patent: Sep. 21, 2010

(54) PACKAGING AND TESTING OF MULTIPLE MEMS DEVICES ON A WAFER

(75) Inventors: Shaoher X. Pan, San Jose, CA (US); Vlad Novotny, Los Gatos, CA (US)

(73) Assignee: Spatial Photonics, Inc., Sunnyvale, CA (US)

( * ) Notice: Subject to any disclaimer, the term of this patent is extended or adjusted under 35 U.S.C. 154(b) by 183 days.

(21) Appl. No.: 12/186,747

(22) Filed: Aug. 6, 2008

(65) Prior Publication Data

US 2010/0033799 A1 Feb. 11, 2010

(51) Int. Cl.
G02B 26/00 (2006.01)
H01L 23/58 (2006.01)
H01L 21/66 (2006.01)

(52) U.S. Cl. .................... 359/291; 257/48; 438/15; 438/16

(58) Field of Classification Search ............ 257/48, 257/E21.521, E21.526, E21.529, E21.531; 359/291; 438/14, 15, 16, 17
See application file for complete search history.

(56) References Cited

U.S. PATENT DOCUMENTS

| 4,859,832 | A | * | 8/1989 | Uehara et al. | 219/411 |
| 5,156,461 | A | * | 10/1992 | Moslehi et al. | 374/121 |
| 5,446,825 | A | * | 8/1995 | Moslehi et al. | 392/416 |
| 6,395,563 | B1 | * | 5/2002 | Eriguchi | 438/7 |
| 6,616,332 | B1 | * | 9/2003 | Renken et al. | 374/162 |

* cited by examiner

*Primary Examiner*—David N Spector
(74) *Attorney, Agent, or Firm*—Fish & Richardson P.C.

(57) ABSTRACT

A wafer containing a plurality of electro-optical devices, each device being enclosed in chamber that has a translucent cover. An X-Y matrix of pairs of interconnections on the wafer are connected to the circuitry of the electro-optical devices for addressing the electro-optical devices. The pairs of interconnections extend outside of the chambers enclosing the devices to testing areas on the periphery of the wafer. Testing is done by signals applied through the interconnections while simultaneously exposing the devices to light through the translucent covers.

6 Claims, 6 Drawing Sheets

PACKAGING AND TESTING OF MULTIPLE MEMS DEVICES ON A WAFER

BACKGROUND

The present disclosure relates to the packaging and testing of spatial light modulators.

In manufacturing MEMS devices, such as spatial light modulators, multiple spatial light modulators (SLMs) are commonly fabricated on a semiconductor wafer. The individual (SLMs are then respectively sealed in chambers and subsequently separated into individual encapsulated dies. The chambers typically include transparent windows through which the SLMs receive and output optical signals. The operations of the SLMs are preferably tested at the wafer level before they are individually packaged and used in final product apparatus.

In the wafer level testing of normal, encapsulated integrated circuits, such as microprocessors, the test pads of each device are readily accessible to test probes. Often debris is formed by the probes making mechanical, vibrating contact with the test pads, but such debris has no deleterious impact on the integrated circuit device that is already encapsulated and protected.

However, in the case of testing MEMS devices, such as SLMs, where mechanical contact with test pads before the encapsulation is common, the resulting debris will remain inside MEMS cavity and often can wreak havoc with the devices, such as by causing shorts across the delicate metal traces or mechanically blocking the moving parts of the MEMS.

It is highly desirable to test the electro-optical devices at the wafer level before their singulation into individual dies and before their attachment onto the final substrates. Although it would be possible to test the devices after singulation, such testing requires alignment of each individual die before test electrical contact can be made to it. Such die level testing therefore requires expensive handling and alignment equipment and long alignment times, increasing cost.

In addition, certain electro-optical devices, such as SLMs, cannot be tested until all devices on the wafer have been respectively enclosed in individual sealed chambers. This means that testing is done after wafer level encapsulation and sealing.

It is possible to encapsulate and seal the individual devices on the wafer and then expose the electrical contacts of the devices by removing portions of the encapsulation material from the areas covering the electrical contacts. Such a process is difficult, as sections of the encapsulation have to be removed without damaging the electrical contacts or the electrical interconnections of the underlying devices. Moreover, after dicing the wafer into individual dies, it is difficult to clean the dicing debris and to obtain reliable electrical contacts so that testing can be carried out with a high degree of confidence.

In the case of SLMs, mechanical and optical testing is required in addition to electrical testing. Before testing, some SLMs having moving mirrors that make mechanical contact with a landing pad require an anti-stiction material to be applied within the chamber. For such material to be effective, the chamber must be sealed and the anti-stiction material activated. If this material is not applied before testing, mirrors may stick during the test, making the test results unreliable and making further testing impossible.

SUMMARY

In one general aspect, the present invention relates to a wafer that includes a plurality of electro-optical devices, such as SLMs, each device being enclosed in chamber. The wafer also includes an X-Y matrix of pairs of interconnections, each pair of interconnections being connected to the circuitry of an electro-optical device for addressing the electro-optical device. The connected pairs of interconnections extend outside of the chambers enclosing the devices to testing areas on the periphery of the wafer.

In another general aspect, the present invention relates to a method for testing a plurality of encapsulated electro-optical devices on a semiconductor wafer including the steps of transmitting an electric signal through a pair of interconnections selected from an X-Y matrix of interconnections on the wafer, from electrical terminals located on the selected interconnections at the periphery of the semiconductor wafer, to an associated electro-optical device, the electro-optical device being encapsulated at least partially with a translucent material in a first chamber on the wafer. Then, while the electric signal is present, incident light is passed through the translucent material of the chamber encapsulating the associated electro-optical device and reflected from, or transmitted through, the associated electro-optical device to form a reflected or transmitted light beam.

Various implementations of the methods and devices described herein may include one or more of the following advantages. The disclosed systems and methods allow a plurality of electro-optical devices to be tested on a wafer at high throughput, reducing the testing time and cost.

Although the invention has been particularly shown and described with reference to the embodiments described, it will be understood by persons skilled in the relevant art that various changes in form and details can be made therein without departing from the spirit and scope of the invention.

DESCRIPTION OF DRAWINGS

The following drawings, which are incorporated in and form a part of the specification, illustrate embodiments of the present invention and, together with the description, serve to explain the principles, devices and methods described herein.

DETAILED DESCRIPTION

Figure 1:
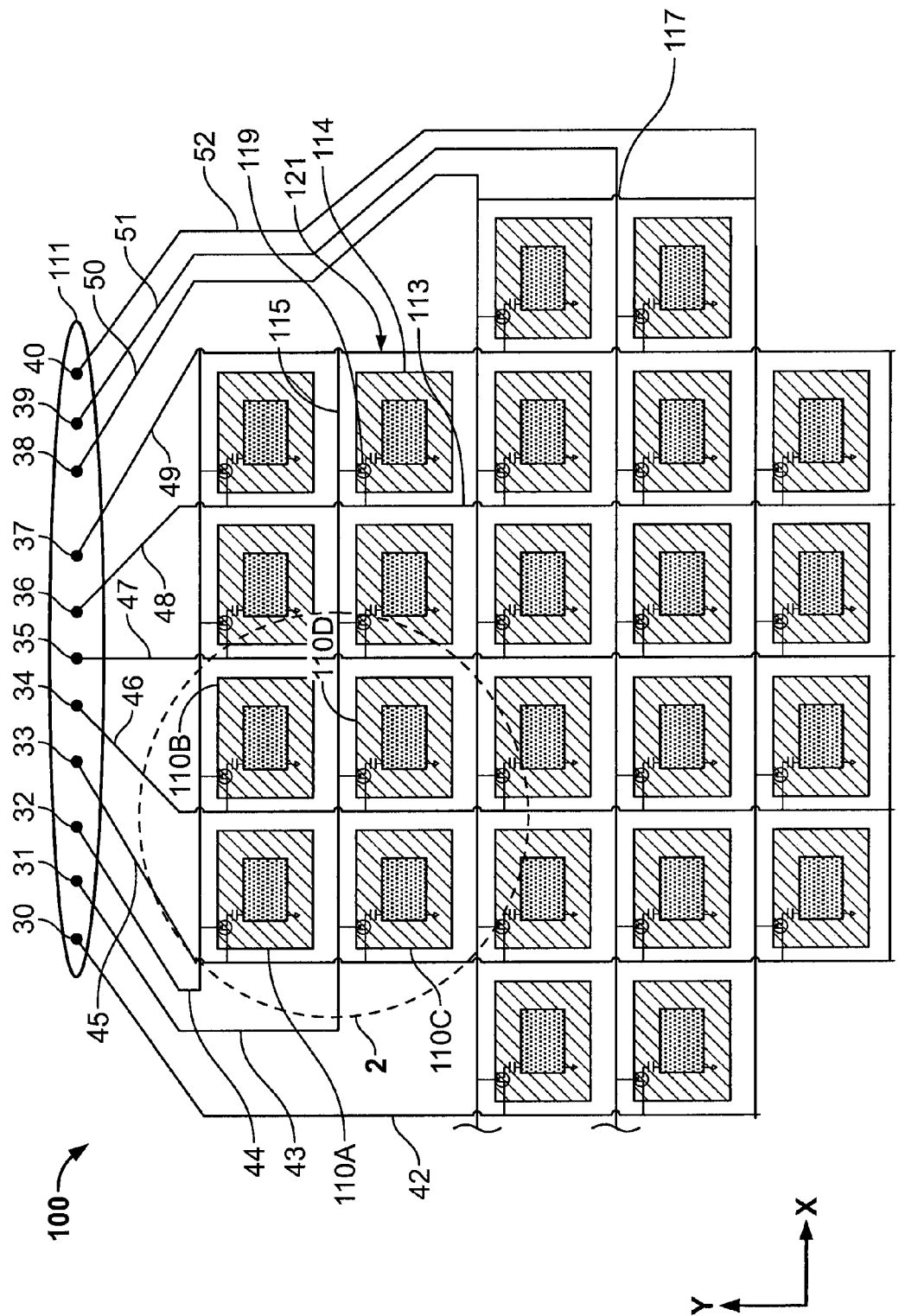
FIG. 1 is a top view of a part of a wafer comprising a plurality of electro-optical devices, terminals, and an X-Y matrix of interconnections for testing the electro-optical devices.
Figure 2:
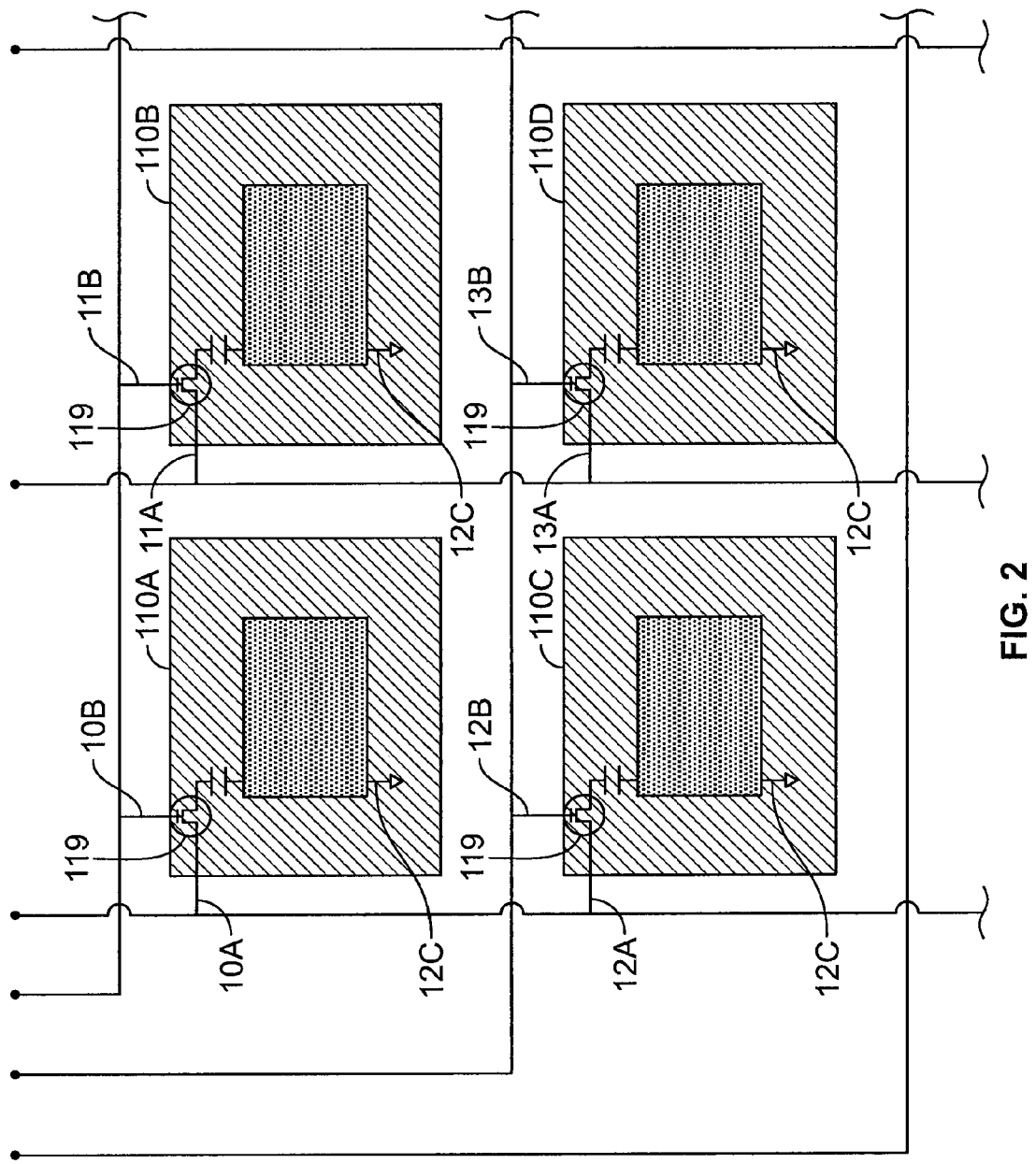
FIG. 2 is a detail top view of the four electro-optical devices on the part of a wafer of FIG. 1 shown in FIG. 1 as dotted circle 2.

Referring to FIGS. 1 and 2, a wafer 100 includes a plurality of electro-optical devices, including devices 110A-110D shown in FIG. 2. In the present specification, the term "wafer" is used to refer a combination that includes a substrate, the electro-optical devices, the addressing circuitry, and the electrical terminals that are on the wafer.

In some embodiments, the electro-optical devices 110A-110D are spatial light modulators, such as arrays of micro mirrors or reflective or transmissive liquid crystal display devices, for example LCD devices. Twenty four electro-optical devices are shown in FIG. 1 for simplicity, but the techniques described below are applicable where two or more devices are formed on a substrate. The electro-optical devices 110A-110D shown in FIG. 2 can be constructed on the substrate wafer 100 by a sequence of deposition, lithography and etching steps, as is well known in the art.

This invention allows the devices to be tested at the wafer level before dicing. The testing in accordance with the invention can be performed without requiring the exposing of the electrical pads of the individual devices. Referring to FIG. 1, the X-Y matrix of electrical interconnections include a Y connection 113 and an X connection 115. It will be seen that there are other connections in the matrix in both the X and Y directions that are not numbered to avoid clutter, and the entire matrix will hereafter be referred to by the reference numbers 113, 115. This matrix 113, 115 can be extended to testing area 111 on the periphery of the wafer 100. The X-Y matrix 113, 115 is arranged in such a way that signals may be applied to selected contact pads 30-40 in testing area 111 so that only a single device, or a region consisting of part of a single device, is turned on or off at any particular time while the electrical and/or optical testing is performed.

It is possible, if the devices on a row or column of devices are all interconnected in parallel, that all the devices in that row or column turn on and off based upon appropriate test signals applied to testing area 111 at the periphery of wafer 100. With many electro-optical devices, however, each having many mirrors, it is preferable to turn on only an individual device or preferably a small section of an individual device at a given time, because if all the mirrors were to be turned on simultaneously, the driving requirements (transient currents) would be extreme even for a single electro-optical device.

According to the invention, the electrical interconnects are arranged in an X-Y matrix 113,115 in a manner similar to X-Y addressing of direct view displays or memories, as shown in FIG. 1. The minimum number of electrical lines, such as lines 113 and 115, is equal to the sum of the number of row and columns of electro-optical devices. When signals are passed to lines 113 and 115, for example, connections are made directly to the electro-optical device 114, or to switching device 119 that is in turn connected to the device 114. These switching devices may be diodes or transistors that can handle the voltages required to activate the devices. Even though only two electrical lines are schematically shown to be connected to each switching device for simplicity, in the many cases, additional electrical lines are connected to these devices to provide higher voltages to drive the devices. These higher driving voltages can be applied continuously to all devices under test, while lower switching voltages may be applied to the X and Y lines to address the selected device for testing. Alternatively, higher voltage switches or diodes can be used to address the selected devices for testing.

Referring to FIG. 2, a pair of testing electrodes 10A and 10B, 11A and 11B, 12A and 12B, and 13A and 13B are each respectively positioned in the vicinity of an electro-optical device 110A, 110B, 110C and 110D and are configured to receive electric signals for controlling the operation of their respective associated electro-optical device. For example, if the electro-optical device 110A is an array of tiltable micro mirrors, electrical control signals received by the adjacent pair of testing electrodes 10A,10B can control the tilt movement of the micro mirrors of the device 110A. Electrode 12C on each die serves as a ground connection.

Referring to FIGS. 1 and 2, the wafer 100 further includes a plurality of electrical terminals 30-40 in a testing area 111 near the edge of the wafer 100. The X-Y array of interconnections that include conductive lines 42, 43, 44, 45, 46, 47, 48, 49, 50, 51 and 52, on the wafer 100 connect the respective electrical terminals 30-40 on the periphery of wafer 100 to the testing electrodes 10A, 10B, 11A, 11B, 12A, 12B, 13A and 13B near the respective electro-optical devices, such as devices 110A-110D. These electrically conductive lines can be constructed on or partially buried in the wafer 100. Alternatively, they can be constructed under the top surface of the wafer 100.

The electro-optical devices are disposed in rows and columns as shown in FIG. 1. The X-Y matrix of interconnections include, for example, horizontal conductive line 115 distributed along the row direction and respectively connecting certain of the testing electrodes in test area 111 to the row of electro-optical devices 121.

Figure 3:
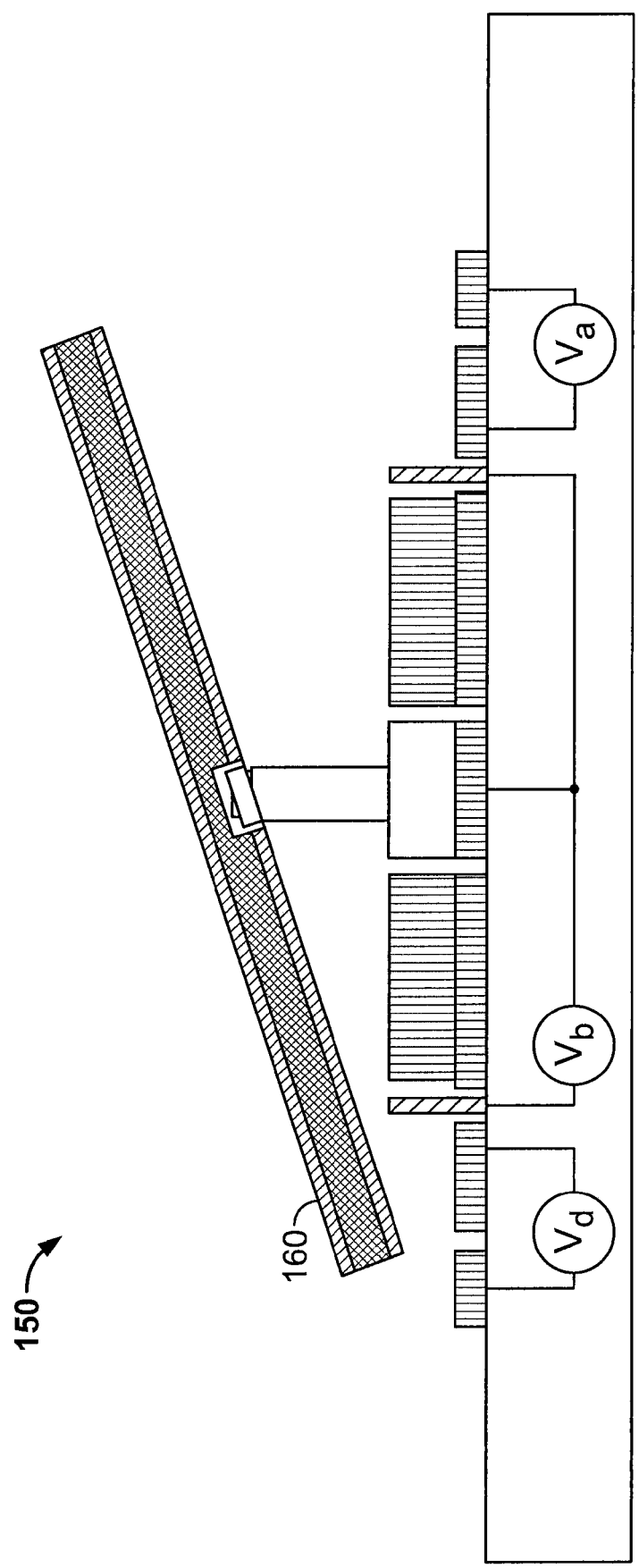
FIG. 3 is a cross-sectional view of an exemplary spatial light modulator.

After device testing, the wafer 100 is diced to form a plurality of dies each containing one of the individual electro-optical devices shown in FIG. 1. After singulation, the conductive lines 42-52 shown in FIG. 1 are cut and may be discarded or in any event have no further use after the individual dies are formed. In some embodiments, the electro-optical devices are arrays of tiltable micro mirrors 150 shown in FIG. 3.

Figure 4:
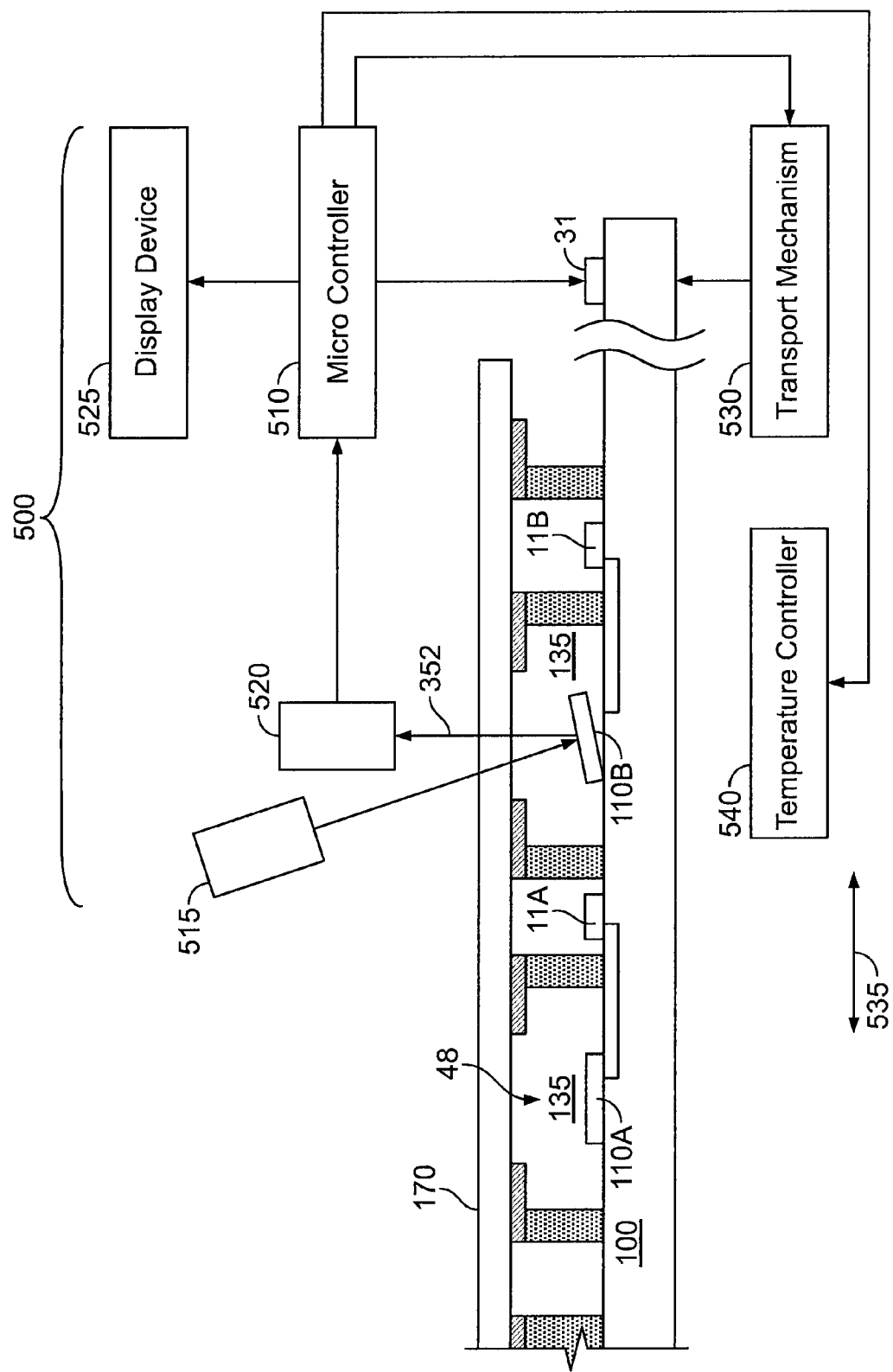
FIG. 4 is a cross-sectional view of two electro-optical devices and a test system showing the encapsulation layer over the wafer that is used to encapsulate in part the devices on a wafer.

Referring to FIG. 4, a part of a wafer of electro-optical devices is shown. Devices 110A and 110B are encapsulated in cavities 135 that are fully enclosed by an encapsulation layer 170. At this stage, encapsulation layer 170 has not been diced, so that electrodes 11A and 11B cannot be accessed. Preferably encapsulation layer 170 is glass or other translucent material, for reasons that will be described below. As is shown in FIG. 4, peripheral electrodes, such as electrode 31 shown both on FIG. 1 and FIG. 4, that are used for testing the devices, are exposed laterally outside the area of the encapsulation layer 170. This arrangement where the devices are encapsulated in chambers 135 by transparent encapsulation layer 170 allows the devices to be tested by applying the appropriate signals to the exterior electrodes, such as electrodes 30-40 shown in FIG. 1.

A testing system 500 includes micro controller 510 that is configured to send electrical signals to the exemplary electrical terminal 31 and to other similarly located terminals to control the electro-optical devices such as illustrated devices 110A and 110B in FIG. 4 in the different chambers 135. The testing system 500 also includes a light source 515, such as a laser, that can emit incident light upon an electro-optical device 110A or 110B, and a camera 520 that can detect the light beam 352 reflected from the mirrors 160 (FIG. 3) of the electro-optical device 110A-110D. The images captured by the camera 520 can be fed to the micro controller 510 and displayed by a display device 525. A transport mechanism 530 can move the substrate 100 under the control of the micro controller 510 in a direction 535. Different electro-optical devices such as exemplary devices 110A and 110B can thus be moved under the light source 515 and the camera 520 for testing. The transport mechanism 530 can also move different rows of electro-optical devices to be under the light source 515 and the camera 520.

The testing system 500 can also include a temperature controller 540 in thermal contact with the substrate 100. The temperature controller 540 is also controlled by the micro controller 510. The temperature controller 540 is able to control the temperature of the substrate 100 and the electro-optical devices 110A and 110B.

Figure 5:
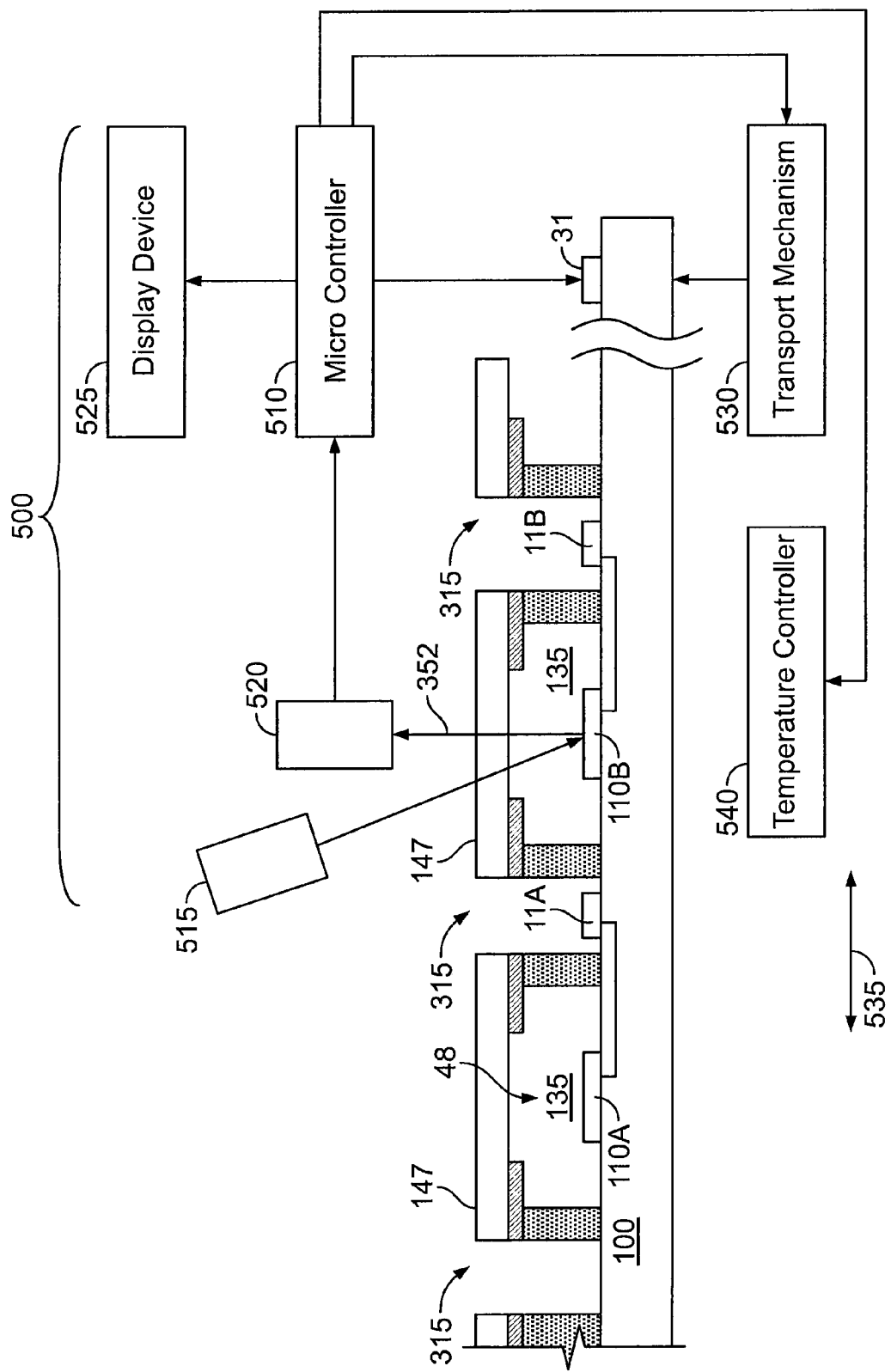
FIG. 5 is a cross-sectional view of the devices and test system of FIG. 4 after the encapsulation layer, but not the wafer, has been diced.

An alternative way of testing is shown in FIG. 5. In FIG. 5, the encapsulation cover 170 (shown in FIG. 4) has been sliced to form slots 315 between translucent covers 147. With these slots cut, electric signals may be applied directly to testing electrodes 11A and 11B through the slots 315 between the chambers 135 for testing the electro-optical devices exemplified by devices 110A and 110B. This method of testing is less desirable because it is difficult and time consuming in practice. A wafer may include hundreds of electro-optical devices and it takes considerable time to make electrical connections to the proper electrodes, such as electrodes 11A or 11B shown in FIG. 5, for each electro-optical device. Moreover, the openings 315 are typically quite narrow. For example, their widths 315 may be narrower than 1 millimeter, such as in the range of tens to hundreds of microns. Therefore it is difficult for a testing probe to access these testing electrodes before the wafer 100 is diced into individual dies.

Therefore the preferred method of testing of this invention is to test before these openings 315 are formed by dicing of the translucent cover 170, as shown in FIG. 4

Referring to FIGS. 1 and 4, the exposed electrical terminals 30-40 along the edge of the wafer 100 enable rapid and simple electrical connection to the difficult to reach testing electrodes. Connection may be made to multiple devices on a substrate or wafer 100 simultaneously, and the individual devices may be encapsulated in chambers 135 while being tested, as the terminals 30-40 are located outside the encapsulation and connected to the encapsulated devices through conductive lines 42-52. Signals from these lines may be used to simultaneously test aspects of multiple devices, whether or not they are fully encapsulated with translucent layer 170 intact, as shown in FIG. 4, or where the translucent encapsulation layer 170, but not the wafer 100, has been diced, as shown in FIG. 5. If the reflected or transmitted light is to be detected, the encapsulation layer 170 (FIG. 4), and thus the covers 147 (FIG. 5) must be made using a translucent material to allow light to be transmitted to and from the encapsulated device. In such a test, in response to electrical signals, a light beam is directed through the translucent cover 147 to the mirrors on the device. The light reflected from these mirrors is measured as an indication of the operation of the device.

Still referring to FIG. 5, in the devices herein illustrated, the electro-optical device 110B can be moved by the transport mechanism 530 under the light source 515 and the camera 520. The micro controller 510 sends a signal to the light source 515 to emit an incident light beam on all the pixel cells in the electro-optical device 110B. The micro controller 510 sends one or more signals to the electrical terminal 31 to actuate pixel cells in the electro-optical devices 110A, 110B, or both. For example, as the mirror 160 of the device (FIG. 3) can be tilted to an "on" position in response to an electrical signal received at electrical terminal 31, as described above.

The reflected light beam 352 travels from device 110B through one of the transparent encapsulation covers 147 to be subsequently captured by the camera 520. An image of the pixel cells of the electro-optical device 110B is thus captured by the camera 520. A bright image pixel formed by the reflected beam from a mirror plate from that pixel cell can indicate the proper function of the micro mirror of that pixel cell in the electro-optical device 110B. A dark image pixel corresponding to a pixel cell in the electro-optical devices 110B can indicate that a mirror plate failed to tilt properly. A pixel cell in an electro-optical device can fail due to various reasons. For example, a micro mirror may not have broken electric control circuit to a pixel cell. The encapsulation of the electro-optical devices by the chambers 135 can also introduce particles that affect the performance of the pixel cells. The micro controller 510 can control the mirror plates to tilt between the un-tilted positions and the "on" positions several times while the incident light beam is illuminated on the reflective mirror plates. A series of images can be captured by the camera, which can be displayed and analyzed to assure the proper performance of the electro-optical device 110B.

Alternatively, if the electro-optical device is a transmissive device, such as an LCD (Liquid Crystal Display) device, then instead of being located above the electro-optical device 110B, as shown in FIG. 4, camera 520 is located on the opposite face of the device from the source of light 515, looking at device 110B from the underneath. If the inputted signals require the device to be transmissive, as opposed to reflective, then the camera 520, located beneath the device, will detect the transmitted light from source 515 and determine for that test that the device is operating satisfactorily.

When contact lithography is used to fabricate the electro-optical devices, electrical interconnects can be defined with a single contact mask and all peripheral electrical contacts can be routed on one side or multiple sides of the wafer. When projection lithography is employed to fabricate the devices, the peripheral electrical routing, such as lines 42-52 in FIG. 1, is preferably done with contact lithography, typically at lower resolution than projection lithography. High resolution lithography is not required for the peripheral electrical routing.

Figure 6:
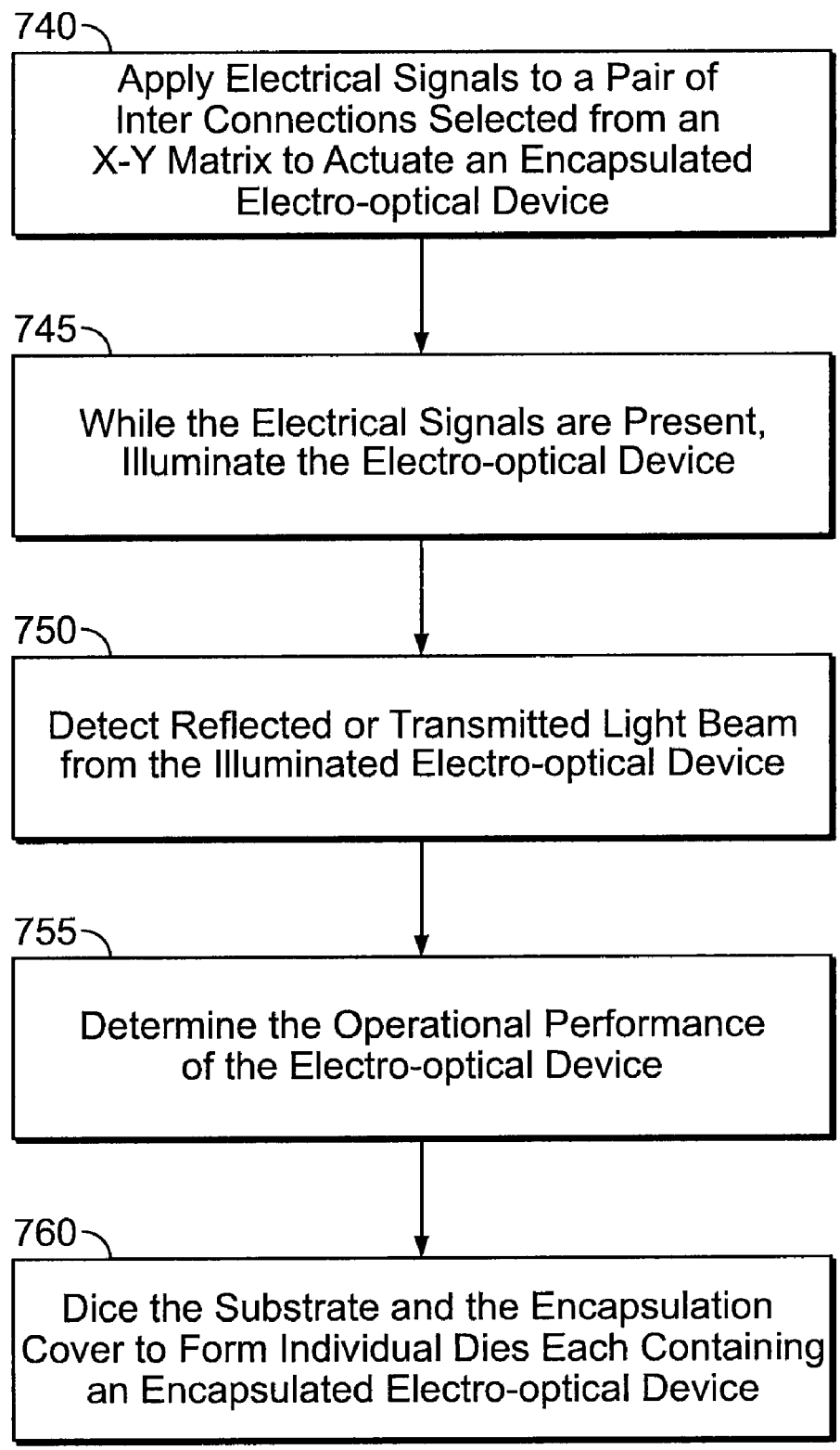
FIG. 6 is a flowchart showing the steps of testing electro-optical devices on a wafer.

FIG. 6 is a flowchart showing the steps of testing a plurality of electro-optical devices on a wafer. The electro-optical devices encapsulated in the chambers are then tested by a testing system. Electrical signals are applied (step 740) through a pair of interconnections selected from an X-Y matrix of interconnections on the wafer from electrical terminals located on the selected interconnections at the periphery of the semiconductor wafer to actuate one or more electro-optical devices associated with the selected X-Y pair of interconnections. The selected electro-optical device near a light source and a camera is illuminated by an incident light beam emitted by the light source (step 745). Light reflected from (or transmitted through) the electro-optical device is detected by the camera (step 750). The image captured by the camera is analyzed to determine whether the selected pixel cells in the electro-optical device or devices are functional, and to determine the operational performance of the electro-optical device or devices (step 755). If one or more failed pixels are detected, the electro-optical device may be labeled as defective.

In the preferred embodiment where the devices are tested with the translucent layer 170 intact (FIG. 4), after the testing of all desired electro-optical devices on the substrate, by repeating the above process until all pixels and desired devices have been tested, the wafer 100 and translucent layer 170 are scribed and diced together to form individual dies each containing at least one electro-optical device (step 760) encapsulated by a translucent cover 147 (FIG. 5). The portion of the wafer containing the electrical terminals, such as terminals 30-40 shown in FIG. 1 and terminal 31 in FIGS. 4 and 5, is discarded. The conductive lines 42-52 also are cut and no longer used after the individual dies are formed.

Alternatively, the dicing can be done in two separate steps, dicing the cover first, to expose slots 315 between the devices, as shown in FIG. 5, and then after testing, dicing the substrate 100. Defective electro-optical devices may be discarded. The dies containing functional electro-optical devices can be further packaged and shipped to customers.

The above disclosed methods and devices may include one or more of the following advantages. The disclosed systems and methods allow a plurality of electro-optical devices, including those sealed in chambers, to be tested on a wafer at high throughput. The time and thus cost for device testing can be reduced.

It is understood that the disclosed systems and methods are compatible with other configurations of electro-optical devices and encapsulation devices, and other layouts for the electrical terminals and the conductive lines on the wafer. The electrically conductive lines can be formed in a single semiconductor layer on the substrate or in multiple layers. The testing system can include different or additional components. One device may be tested at a time, or parts of one device, or parts of multiple devices. For example, a corresponding block of pixels, but less than all of the pixels, of multiple micromirror or LCD devices may be tested at the same time.

The testing process may include other steps. The determination of the failed pixel cells can involve the use of automated image analysis software. The electrical terminals can be connected to more than two electrodes for each electro-optical device, and multiple X-Y pairs of interconnections may be selected simultaneously. The electrodes of the devices, for example, may include some located upon a lower conductive surface of a tiltable mirror plate as well as electrodes on the substrate under a tiltable mirror plate. Furthermore, the tiltable mirror plates can be tilted to more than two positions during testing.

Other modifications may be made to the testing structures and methods disclosed above without departing from the spirit and scope of the invention, which is to be limited only as set forth in the claims, below.

What is claimed is:

1. A wafer, comprising:
   a plurality of electro-optical devices constructed on a semiconductor wafer, each device being enclosed in chamber;
   an X-Y matrix of pairs of interconnections on the wafer, each pair of interconnections being connected to the circuitry of an electro-optical device for addressing the electro-optical device and extending outside of the chamber enclosing the device to testing areas on the periphery of the wafer.

2. The wafer of claim 1, wherein a switch is coupled between one of the pairs of interconnections and the electro-optical device.

3. The wafer of claim 2, wherein the switch is a diode or a transistor.

4. The wafer of claim 1, wherein the circuitry of the electro-optical devices may be fabricated either by projection or contact lithography, and wherein the X-Y matrix of pairs of interconnections is fabricated by contact lithography only.

5. The wafer of claim 2, further including logic circuitry coupled to the switch for controlling the switch to select or deselect the electro-optical device coupled to the switch.

6. The wafer of claim 1, wherein the electro-optical devices are spatial light modulators configured to reflect or transmit incident light beams in response to electric signals.

* * * * *